Jan. 9, 1940. H. L. TRUMBULL 2,186,183
POLYVINYL HALIDE PRODUCT
Filed July 28, 1937

Inventor
Harlan L. Trumbull
By Willis F. Avery
Atty

Patented Jan. 9, 1940

2,186,183

UNITED STATES PATENT OFFICE 2,186,183

POLYVINYL HALIDE PRODUCT

Harlan L. Trumbull, Hudson, Ohio, assignor to The B. F. Goodrich Company, New York, N. Y., a corporation of New York Application July 28, 1937, Serial No. 156,234

5 Claims. (Cl. 244—128)

This invention relates to films and film-coated fabrics which are used to prevent the diffusion of gases, and has as its object to provide such materials possessing a combination of desirable properties which has hitherto been unachieved. The unusual advantages of my new materials will be demonstrated hereafter in the specific examples of uses therefor.

In many different fields, it is desirable or necessary to provide membranes, films, film-coated fabrics and the like to prevent the diffusion of various kinds of gas. The two materials in general usage are rubber and membranes taken from the intestinal tracts of animals, such as goldbeater's skin, colon skin, the membrane removed from the bladder of a pig, etc. It is believed that the diffusion of gas through rubber films and animal membranes occurs for different reasons. In the case of a rubber film, the rate of diffusion essentially depends upon the solubility of the gas in the rubber. The gas dissolves in the rubber on one side of the film and evaporates on the other side where the concentration of the gas is less. The diffusion of a gas through a membrane, however, is essentially caused by the passage of the gas through the capillary tubes which comprise the structure of the membrane. In general, the diffusion through the membranes is less than that through rubber films. Goldbeater's skin and other naturally-occurring membranes are available only in the irregular shapes in which nature provides them. Furthermore, many flaws and imperfections are found which obviously must be cut out. In the commercial use of such membranes, both the natural shape and the imperfections contribute to a considerable loss due to waste material. It is very difficult to prepare a large surface of a naturally occurring membrane which does not leak at the seams of the different small pieces. Though pieces of rubber or rubber-coated fabric may be easily joined to form surfaces, the rate of diffusion is not only appreciably greater than that through natural membranes, but rubber is deteriorated by many common solvents and oily substances, and the natural deterioration of rubber due to oxygen and sunlight causes cracking and porosity.

I have discovered that films of polyvinyl halides are practically impermeable to gases, even if the gases are under considerable pressure. Since polyvinyl chlorides are readily available, I usually make the films therefrom. These polyvinyl chlorides exist in several modifications characterized by differences in solubility which appear to be determined by the degree of polymerization. The highly polymerized gamma polymer is the most useful modification because it is practically insoluble in any solvent at ordinary temperatures. Where the films may be subjected to flexing or mechanical shocks, I usually add a suitable plasticizer to prepare one of the rubber-like compositions of U. S. Patent 1,929,453 issued to Waldo L. Semon.

It is believed that polyvinyl chloride films are superior to rubber films because hydrogen, like most other materials, is practically insoluble in the former. Other gases such as air and nitrogen also diffuse through polyvinyl halides much more slowly than through rubber. Polyvinyl halide films are also less permeable than natural membranes, probably because artificial membranes of polyvinyl halides contain no capillaries. I have found that the rate of diffusion of hydrogen through an artificial membrane containing gamma polyvinyl chloride 50 parts and dibutyl phthalate 50 parts is only one-third of the rate through goldbeater's skin. The flexibility and strength of these artificial membranes far exceed those of the natural products, so polyvinyl halide membranes will last much longer than the natural products when they are subjected to flexing.

There are many other advantages to the use of polyvinyl chloride films. Polyvinyl chloride is extremely stable and does not have a tendency to stiffen, crack, check, or become porous with age. Polyvinyl chloride is also an extremely inert material, being practically insoluble in any solvent at ordinary temperatures. It can therefore be used in the presence of petroleum products, oxidizing acids, and other corrosive materials whose presence would preclude the use of rubber or natural membranes.

Although films consisting only of plasticized polyvinyl halides may be used in some instances, I usually prefer to use fabric impregnated with plasticized polyvinyl halides since the hair-containing films are stronger and more practical for commercial use.

The word "film" is used in the appended claims to include not only a thin sheet of a polyvinyl halide or a plasticized polyvinyl halide but also fabrics impregnated with the same. By the term "impregnated" I do not mean that the polyvinyl halide necessarily permeates the fabric completely, but it must permeate the fabric at least far enough to cause it to adhere thereto. Though plasticized polyvinyl halide solutions may be sprayed or brushed onto the fabric, I prefer to prepare the impregnated fabrics by coating the fabric with a heated polyvinyl halide solution by dipping or spreading or by applying the film to the fabric by means of a calender or friction rolls.

When the dipping process is used, the thickness of the film on the fabric may be easily controlled by successive dippings, or by adding or removing solvent to change the concentration of the solution. Pieces of impregnated fabric may be easily joined by heating and pressing together to form a joint more impermeable than the fabric because there are more layers. If stronger fabrics are desired, several plies may be joined together by means of heat, though the rate of diffusion of a single ply is so small that the use of several plies is impractical for the sole purpose of decreasing the rate of diffusion. If desired, carbon black, clay, barytes or other pigments and fillers commonly used in the rubber and plastics industries may be included in the compositions, and stabilizers such as the bivalent metallic silicates may also be included.

Many different fabrics including cotton, wool, linen, silk, hemp, sisal, etc. may be impregnated with a polyvinyl halide. For use on aerostats I prefer to use impregnated balloon cloth, which cloth is a light cotton fabric which has been singed, desized, and calendered. To replace animal membranes, however, I prefer to use impregnated silk.

Various embodiments within the scope of this invention may be better understood from the accompanying drawing, of which Fig. 1 is a sectional view of a gauge for measuring differences in gas pressure.

Figure 1:
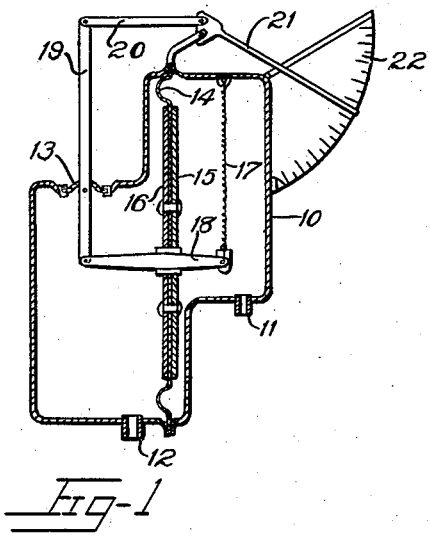

Referring to the drawing, the draft gauge of Fig. 1 consists of an outside wall 10 containing the opening 11 which is connected to the higher pressure, the opening 12 which is connected to the lower pressure, and the opening closed by the sealing diaphragm 13. The diaphragm 14 is attached at its periphery to the outside wall 10, and is clamped between two metal plates 15 and 16. Both diaphragms are made of fabric, preferably silk, impregnated with plasticized completely polymerized vinyl chloride. If the difference in pressure between the gas spaces to which openings 11 and 12 are connected increases, the diaphragm 14 will be moved farther to the left. The supporting spring 17 stretches, and the motion is transmitted through the driving links 18, 19 and 20 to the indicating pointer 21, the difference in the two pressures being read off the scale 22.

Figure 2:
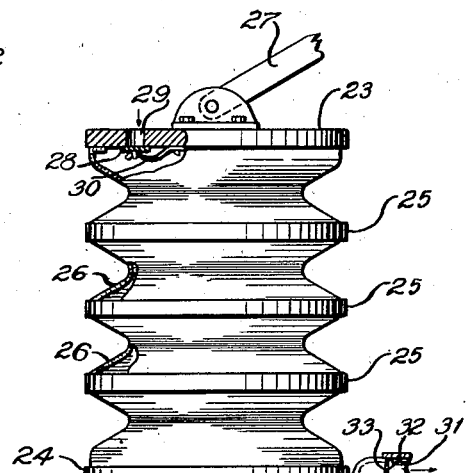
Fig. 2 is an elevation, partly broken away and in section, of a bellows.

The bellows of Fig. 2 consists principally of the ends 23 and 24 usually made of wood or metal and the hoops 25 all connected by the fabric 26 impregnated with plasticized completely polymerized vinyl chloride. When downward force is applied to the bellows through the arm 27, the felt valve flap 28 is held over the opening 29 by the spring 30, and the air is forced through the opening 31 containing the spring 32 and the exhaust valve flap 33.

Figure 3:
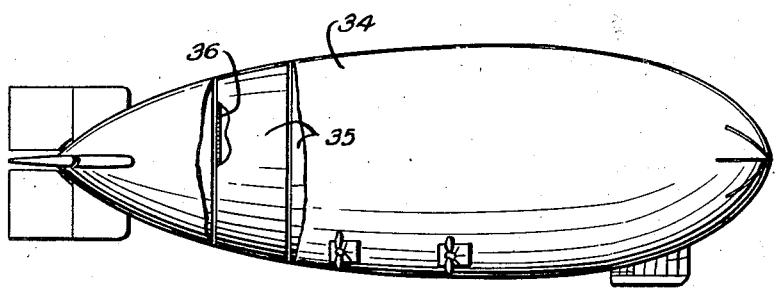
Fig. 3 is an elevation partly broken away and in section of a dirigible balloon.

The dirigible balloon of Fig. 3 is composed of the cover 34 under which are gas cells 35 containing hydrogen or helium. Both the cover and the walls of the cells are made of fabric 36, preferably balloon cloth impregnated with plasticized completely polymerized vinyl chloride.

I have illustrated the use of films comprising a polyvinyl halide in three different modifications.

In the first, differential gas pressure actuates the film, which is used between two gas chambers containing the same gas at different pressures, the amount of displacement of the film depending upon the difference in pressure. Colon skin was formerly used for this purpose, but artificial membranes consisting of silk coated with plasticized completely polymerized polyvinyl chloride makes a greatly improved substitute, since the artificial membranes give longer service than the natural membranes, the uniformity of the artificial membranes allows more accurate readings, and the rate of diffusion through the artificial membrane is much smaller.

In the second modification, an actuating means causes movement of the film which in turn creates a differential gas pressure. Fabric impregnated with plasticized completely polymerized vinyl chloride is very useful in bellows for pipe organs, player pianos, etc. and may be also used in measuring devices employing bellows such as gas meters. Diaphragms made of the films of this invention may also be used to create differential gas pressure in diaphragm pumps. The rate of diffusion of these diaphragms will be minimized when used in the presence of any gas, but these polyvinyl halide diaphragms are especially useful in the presence of reactive gases such as chlorine and sulfur dioxide which would affect rubber diaphragms in a very short time. Polyvinyl halide diaphragms may be also used in the presence of gasoline vapors or other petroleum products where rubber diaphragms would disintegrate in a short time.

In the third embodiment of my invention, illustrated by the dirigible, a polyvinyl halide film is used to separate different gases. The pressure on the inside of aerostats is usually not much greater than atmospheric pressure, but the hydrogen or helium diffuses to the outside, and the air diffuses to the inside causing serious loss of lifting power. Fabric impregnated with a plasticized completely polymerized vinyl halide makes an excellent material for this purpose not only because of its low permeability and low inflammability but also because of its strength and resistance to oxidation.

As a specific example of one embodiment of my invention, plasticized polyvinyl chloride is used to make a balloon fabric which has a lower rate of diffusion than any now in use. Although some balloon coverings for hydrogen-filled balloons have been made of fabric lined with goldbeater's skin, most balloon fabrics have been made of rubberized balloon cloth. Balloon fabric having a rate of diffusion of .45 cu. ft. of hydrogen/sq. yd./24 hours is considered usable, and by using several plies of balloon fabric treated with properly compounded rubber, the rate of diffusion may be reduced to a minimum of about .15 cu. ft. of hydrogen/sq. yd./24 hours. In practicing my invention a plasticized polyvinyl chloride solution was prepared by mixing gamma polyvinyl chloride 52 parts and tricresyl phosphate 48 parts on a roll mill at about 120° C. and dissolving the product in 600 parts of hot chlortoluene. Balloon cloth was dipped in this solution, and the solvent was allowed to evaporate. Balloon fabric coated by this method consistently had a rate of diffusion which was between .017 and .020 cu. ft. of hydrogen/sq. yd./24 hours. Thus, by using polyvinyl halides, fabrics are prepared which show a rate of diffusion of only one-twentieth of the allowable diffusions of rubberized fabrics, and approximately one-tenth of that of the best rubberized fabrics produced.

In short, the low permeability combined with the high resistivity, the ease of manufacture, and the strength and flexibility of polyvinyl halide films and impregnated fabrics makes them superior for many uses to any material heretofore employed. It will be obvious to anyone skilled in the art that many other uses of these products are within the spirit and scope of my invention as defined in the appended claims.

I claim:

1. A gas container at least part of the wall of which comprises a film consisting essentially of plasticized gamma polyvinyl chloride.

2. A gas container at least part of the wall of which comprises fabric impregnated with a material consisting essentially of plasticized gamma polyvinyl chloride.

3. A gas container at least part of the wall of which comprises silk impregnated with a material consisting essentially of plasticized gamma polyvinyl chloride.

4. A gas container containing a different gas than the gas outside, at least part of the wall of which container comprises a film of fabric impregnated with a material consisting essentially of plasticized gamma polyvinyl chloride.

5. A gas container containing gas under different pressure than the gas outside, at least part of the wall of which container comprises a film of fabric impregnated with a material consisting essentially of plasticized gamma polyvinyl chloride.

HARLAN L. TRUMBULL.